(12) United States Patent
Mudulodu et al.

(10) Patent No.: US 8,675,748 B2
(45) Date of Patent: Mar. 18, 2014

(54) SYSTEMS AND METHODS FOR INTRA COMMUNICATION SYSTEM INFORMATION TRANSFER

(75) Inventors: Sriram Mudulodu, Santa Clara, CA (US); Jordan Christopher Cookman, San Jose, CA (US)

(73) Assignee: CSR Technology, Inc., San Jose, CA (US)

( * ) Notice: Subject to any disclaimer, the term of this patent is extended or adjusted under 35 U.S.C. 154(b) by 770 days.

(21) Appl. No.: 12/787,147

(22) Filed: May 25, 2010
(Under 37 CFR 1.47)

(65) Prior Publication Data
US 2011/0293025 A1 Dec. 1, 2011

(51) Int. Cl.
*H04K 1/10* (2006.01)
(52) U.S. Cl.
USPC ............ 375/260; 375/316; 375/324; 375/349
(58) Field of Classification Search
USPC .................................. 375/260, 316, 324, 349
See application file for complete search history.

(56) References Cited

U.S. PATENT DOCUMENTS

| 7,813,441 | B2* | 10/2010 | Jalali et al. ..................... 375/267 |
| 2001/0029189 | A1* | 10/2001 | Mandyam ...................... 455/522 |
| 2005/0228279 | A1* | 10/2005 | Ustuner et al. ................ 600/443 |
| 2008/0207135 | A1* | 8/2008 | Varadarajan et al. ........... 455/69 |
| 2009/0046937 | A1* | 2/2009 | Fenney et al. ................. 382/240 |
| 2010/0008431 | A1* | 1/2010 | Wu et al. ....................... 375/244 |

* cited by examiner

*Primary Examiner* — Leila Malek
(74) *Attorney, Agent, or Firm* — Fulbright & Jaworski LLP (57) ABSTRACT

Systems and methods which provide for reduced intra communication system information transfer by providing a compressed representation of a portion of intra communication system information are shown. An embodiment operates to provide intra communication system transfer of uncompressed received information while providing intra communication system transfer of a compressed representation of information ancillary to the received information. According to embodiments, ancillary information, such as CSI, associated with other transferred information is transferred with reduced data throughput requirements through application of compression techniques with respect to the transferred ancillary information. Embodiments additionally or alternatively reduce the intra communication system information transferred by reducing the received information transferred.

25 Claims, 4 Drawing Sheets

SYSTEMS AND METHODS FOR INTRA COMMUNICATION SYSTEM INFORMATION TRANSFER

CROSS-REFERENCE TO RELATED APPLICATIONS

The present application is related to co-pending and commonly assigned U.S. patent application Ser. No. 12/577,125 entitled "A Method and Apparatus for Deinterleaving in a Digital Communication System," filed Oct. 9, which claims priority to U.S. provisional patent application Ser. No. 61/104,688 entitled "Method and Apparatus for Deinterleaving in a Digital Communication System," filed Oct. 10, 2008, the disclosures of which are hereby incorporated herein by reference.

TECHNICAL FIELD

The invention relates generally to communication systems and, more particularly, to intra communication system information transfer.

BACKGROUND OF THE INVENTION

Various forms of communication systems have become nearly ubiquitous in modern life. For example, wired communication systems of various forms have been used for voice and data communication for quite some time. Various forms of digital subscriber lines (DSL) have been used for internet service provision (data communication) over wires originally installed for telephone voice service. Wired communication systems originally used for analog cable television service have also been adapted for digital cable and internet service provision. Wireless communication systems are commonly implemented with respect to telephones (e.g., cellular telephones, wireless telephone handsets, personal communication systems, etc.), personal digital assistants (PDAs) (e.g., mobile electronic mail platforms, mobile calendar systems, etc.), computers (e.g., wireless local area network (WLAN) enabled computers, cellular network enabled computers, etc.), and even appliances and peripherals (e.g., digital video recorders (DVRs), printers, digital photo frames, current weather display devices, etc.).

In order to provide for robust, often broadband, communication links, such systems have implemented multiple input and/or multiple output techniques. For example, in wireless systems spatial diversity techniques, wherein antennas at the transmitter and/or receiver are physically separated by some distance, have been used to mitigate effects of multipath and fast fading environments. Multiple-input and multiple-output (MIMO) techniques, wherein multiple antennas at both a transmitter and corresponding receiver are used, have been used to provide increased data throughput through spatial multiplexing techniques. Multiple antennas have also been used to jointly and optimally combat fading, and suppress self-interference due to multipath, multiple data streams, and/or interference from other sources. In wired systems, MIMO techniques have been used to effectively mitigate the effect of crosstalk.

Systems implementing multiple input techniques often utilize parallel input signal processing paths, whereby different signals are received at the multiple inputs and processed for combining by respective, parallel signal paths. The processing across these parallel signal paths may be done in parallel, serially, or a combination thereof. Directing attention to FIG. 1, a high level block diagram of a portion of a prior art communication system implementing such parallel input signal processing paths in a master/slave configuration is shown as receiver 100. Specifically, receiver 100 includes received signal inputs 111 and 121, such as may be provided in a spatial diversity configuration, a MIMO configuration, etc., providing signal input to respective ones of input circuits 112 and 122. Input circuits 112 and 122 may comprise radio frequency (RF) tuner circuitry, such as mixers, filters, and/or other circuitry operable to provide selection of a desired frequency band or channel(s). Input circuits 112 and 122 may also include analog to digital converters (ADCs) and/or other circuitry useful with respect to providing received signal processing. The signals of interest as provided by input circuits 112 and 122 are provided to a corresponding one of demodulators 113 and 123 for signal demodulation. Demodulators 113 and 123 operate to provide extraction of symbols or bits from a respective one of the signals of interest as well as to provide other processing (e.g., determining channel state information (CSI) of the associated communication channel).

Figure 1:
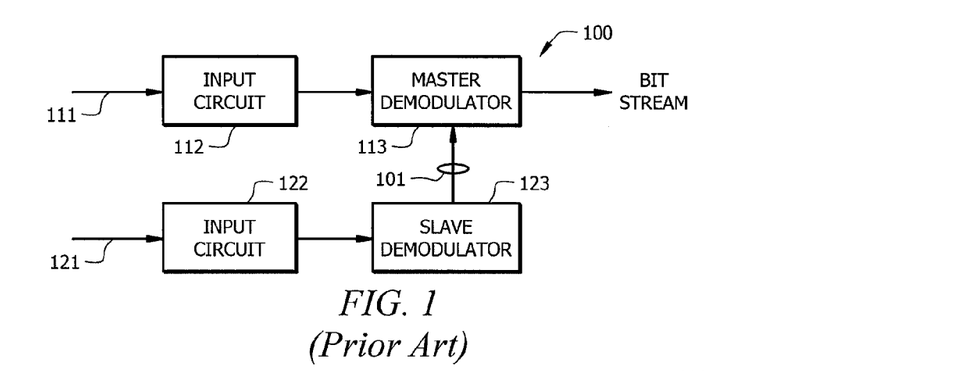
FIG. 1 shows a prior art multiple received signal input receiver configuration.

In implementing a multiple received signal technique, receiver 100 of FIG. 1 provides for the combining of information derived from a signal received at one input with information derived from a signal received at another input. In order to do so, the parallel input signal processing paths must transfer certain intra system communication information. In the illustrated example, demodulator 123 operating as a slave demodulator provides, via link 101, information derived from signals received at received signal input 121 to demodulator 113 operating as a master demodulator for combining with information derived from signals received at received signal input 111. Such combining may comprise diversity combining using well known maximum ratio combining (MRC) or any type of processing used in spatial multiplexing or space-time coding, for example.

Combining techniques implemented in the art, such as the aforementioned MRC, typically utilize some form of CSI, such as signal to interference-plus-noise ratio (SINR), which is derived from the received signal, in order to combine received symbols (here which are also derived from the respective received signal inputs). Accordingly, operation of receiver 100 of FIG. 1 typically requires CSI associated with both received signal inputs 111 and 121 for combining symbol information derived from their respective received input signals. In the master/slave configuration of FIG. 1, demodulator 113, operating as the master demodulator, requires CSI from demodulator 123, operating as the slave demodulator, in addition to the symbol information derived from the signal received by demodulator 123. That is, both its symbol information and associated CSI are passed from demodulator 123 via link 101 to demodulator 113 in operation of receiver 100. Thus, intra communication system information comprises the symbol information and associated CSI.

The transfer rate of information between demodulators 113 and 123 may be appreciable, thus requiring that link 101 provide a relatively high speed link and/or a plurality of parallel paths. For example, where the signals of interest comprise the multicarrier mode of China Terrestrial Television Broadcast (CTTB), as known as Digital Terrestrial Multimedia Broadcast (DTMB) signals, the total transfer rate between demodulators may be approximately 156 Mbps (i.e., 72 Mbps (symbol information)+84 Mbps (CSI)=156 Mbps).

Such intra communication system information transfer requirements can be problematic to implement. For example, where demodulators 113 and 123 comprise separate integrated circuits or "chips," the foregoing intra communication system information transfer may require a substantial number of integrated circuit package pins (e.g., on the order of 6 pins for each slaved input). Regardless of whether demodulators 113 and 123 comprise separate integrated circuits, the foregoing intra communication system information transfer rate may present an operational bottleneck, require appreciable circuit area to implement, consume considerable power, increase the cost of goods, etc.

BRIEF SUMMARY OF THE INVENTION

The present invention is directed to systems and methods which provide for reduced intra communication system information transfer by providing a compressed representation of a portion of intra communication system information. For example, an embodiment of the invention operates to provide intra communication system transfer of uncompressed symbol information while providing intra communication system transfer of a compressed representation of information ancillary to the symbol information (referred to herein as ancillary information). Embodiments thus operate to reduce the intra communication system information transfer requirements without significant loss of performance.

Embodiments of the invention are implemented with respect to system configurations utilizing multiple received signal inputs (e.g., input diversity systems, single-input and multiple-output (SIMO) systems, MIMO systems, space time coding systems, spatial multiplexing systems, etc.) wherein separate integrated circuits provide parallel signal processing paths (i.e., two or more parallel processing paths), whereby different signals are received at the multiple inputs and processed for combining. Symbol information derived from a signal received at an input of one of the parallel signal processing paths is transferred between the integrated circuits of the parallel signal processing paths for combining with other symbol information. Additionally, ancillary information, such as CSI, associated with the symbol information is also transferred between the integrated circuits of the parallel signal processing paths for facilitating the combining of the symbol information. The data throughput requirements for the link between integrated circuits of the parallel signal processing paths are reduced through application of compression techniques with respect to the transferred ancillary information.

For example, one of the foregoing integrated circuits may act as a master and receive symbol information from the other integrated circuit, acting as a slave. The combining of symbol information may be performed using one or more techniques, such as MRC, which utilize ancillary information providing knowledge of the channel, such as CSI. Thus, in addition to the symbol information, CSI is also transferred from the slave to the master according to embodiments. Such CSI is transferred using a compressed representation according to embodiments of the invention.

In various embodiments, the communication system uses multicarrier transmission technique. A widely used multicarrier transmission technique is orthogonal frequency division multiplexing (OFDM). Examples are the orthogonal frequency division multiple access (OFDMA) and OFDM modes of WiMax (802.16e), multicarrier mode of CTTB and multicarrier modes of WLAN. In such systems, transmit symbols are transmitted across both frequency (or subcarriers) and time (or OFDM frames or OFDM symbols). It has been observed that, for many conditions, the time frequency coherence product of the communication channel (e.g., wireless communication channel) is several times larger than that of the actual transmitted/received information. The transmitted information or the transmitted symbols often vary across every subcarrier and every OFDM symbol. Thus, in arriving at the present invention it was discovered that the CSI across time and frequency can be represented by fewer values with negligible or no effect on the combining of symbol information. For example, CSI may be compressed according to embodiments of the invention using time and/or frequency averaging, sampling in 1 dimension (1D) in time and/or frequency, sampling in 2 dimensions (2D) (e.g., repetitions of diagonal sampling), non-uniform sampling (e.g., in 1D or 2D), and/or the like. In some situations, such compressed representation of CSI provides improved results with respect to combining of received information, due to mitigation of errors in CSI estimation. Errors in CSI estimation may occur due to errors in channel estimation.

In operation according to embodiments, the compressed or otherwise reduced CSI is transferred from the slave integrated circuit to the master integrated circuit, and the master integrated circuit reconstructs the actual CSI or otherwise processes the CSI for facilitating combining of symbol information. In a CTTB application, for instance, where the total prior art transfer rate typically is approximately 156 Mbps, operation according to embodiments reduces the total transfer rate to approximately 75 Mbps without any loss in performance (i.e., the transfer rate for the CSI transferred is reduced to approximately 2 to 3 Mbps). Embodiments of the invention operate to reduce the ancillary data transferred even further than the foregoing example, depending on the channel conditions.

The ancillary information (e.g., CSI) transferred according to embodiments of the invention may be transferred in a form different than that which is ultimately utilized to facilitate information combining or other processing. For example, raw pilot information (as opposed to CSI obtained from the raw pilots) may be transferred according to embodiments of the invention. The raw pilot information can be compressed or otherwise reduced according to the concepts herein for intra communication system information transfer. Such embodiments may, for example, be utilized with respect to digital video broadcasting-terrestrial (DVB-T) systems, digital video broadcasting-second generation terrestrial (DVB-T2) systems, orthogonal frequency-division multiplexing (OFDM) systems (e.g., IEEE 802.16 or WiMax), etc.

Embodiments of the invention reduce the intra communication system information transferred by reducing the symbol information transferred in addition to or in the alternative to reducing ancillary information. For example, embodiments operate to reduce symbol information transferred by skipping (not transferring) symbols of the received information. The master may observe the quality of sub-carriers as received by the master and identify the "bad" sub-carriers and then request that the slave provide its symbol information only for the subcarriers identified as "bad" tones at the master. Alternatively, the slave may operate to identify the sub-carriers for which symbol information is to be provided to the master autonomously, without information from the master. For example in an embodiment where SINR is used as CSI, the slave may skip transfer of CSI and symbol information associated with subcarriers that have very low SINR. The slave may identify these subcarriers to the master rather than transferring symbol information derived therefrom. In this example, the set of sub-carriers determined to be "bad" are themselves transferred as a reduced representation of the ancillary information.

Reduction in the transferred information is provided according to embodiments of the invention through reversing the rolls of master and slave circuitry from time to time. For example, where the information received by the slave is received so as to require less manipulation through the aforementioned combining than the information received by the master, and thus a reduction in the transferred information could be realized (e.g., reduction in transfer of received information and/or ancillary information), the master and slave may switch their roles to minimize the information exchange. Such a technique is particularly well suited for configurations wherein the antennas of a receiver system are separated by several times the wavelength of transmitted signal.

From the foregoing it can be appreciated that embodiments of the invention reduce the cost of supporting diversity. Additionally, embodiments reduce pin count utilized for intra communication system information transfer, provide for lower power operation, utilize lower circuit area for implementing intra communication system information transfer, simplify hardware design for the blocks that use the transferred information, facilitate lower cost systems, and/or the like. Embodiments of the invention benefit multicarrier diversity solutions, such as CTTB, DVB-T, DVB-T2, ISDB-T, DAB, DMB-T, ADSL, VDSL, WLAN, etc., as well as other applications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 2:
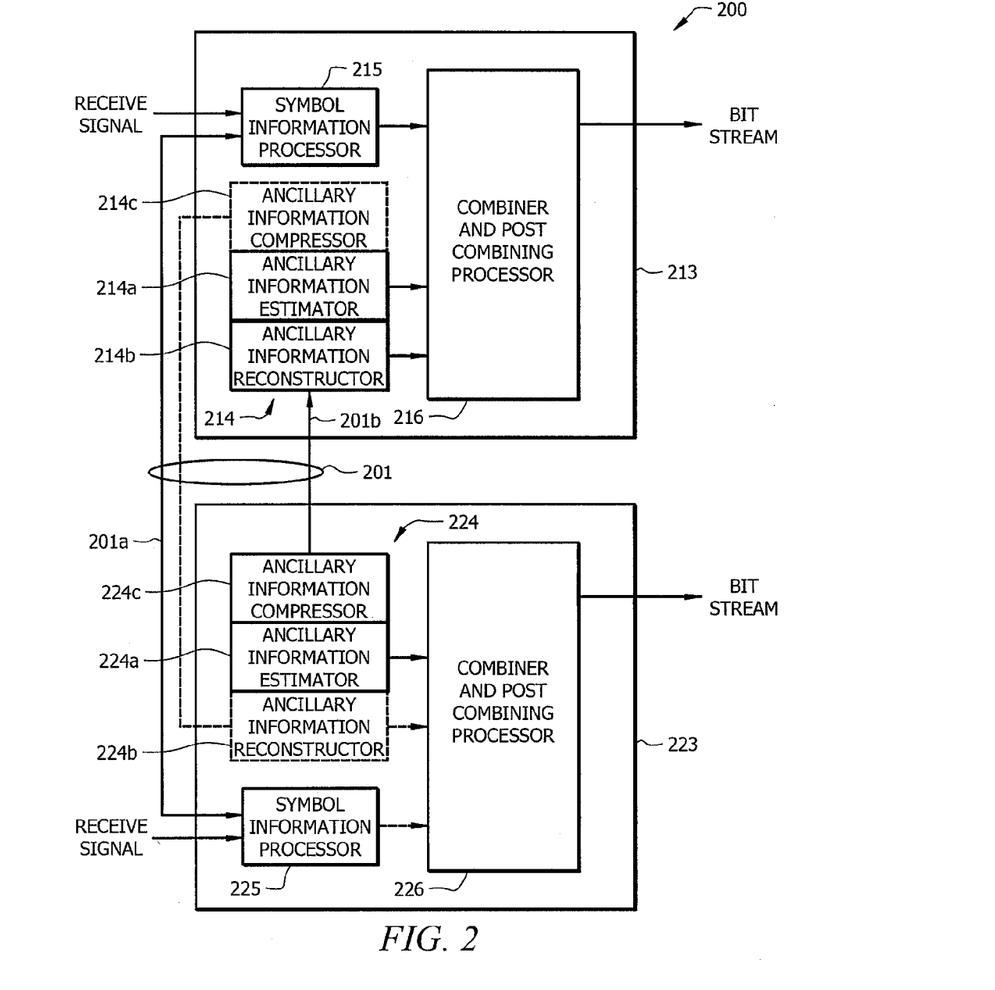
FIG. 2 shows a portion of a multiple received signal input system adapted according to embodiments of the invention.

FIG. 2 shows a portion of system 200 adapted to provide reduced intra communication system information transfer by providing a compressed representation of a portion of intra communication system information. System 200 may, for example, comprise a receiver with multiple received signal inputs (e.g., spatial diversity receiver, MIMO receiver, etc.) provided for example by respective separate antennas or separate wires, etc. It should be appreciated that, although the embodiment illustrated in FIG. 2 show two signal processing paths, embodiments may implement different numbers of master and/or slave signal processing paths. Likewise, it should be appreciated that, although embodiments are described herein with reference to receiver circuitry in order to aid in understanding the invention, the concepts of the present invention are applicable to circuitry in addition to or in the alternative to such receiver circuitry. For example, the concepts herein may be applied with respect to transmitter circuitry where intra communication system transfer of information is utilized.

System 200 of the illustrated embodiment comprises demodulators 213 and 223 providing parallel, or partially parallel, signal processing paths for demodulation of information from a plurality of input signals. Demodulators 213 and 223 of embodiments comprise separate integrated circuits or "chips" and link 201 provides intra communication system information transfer there between. However, demodulators 213 and 223 of alternative embodiments may comprise different configurations, such as circuitry of a same integrated circuit. It should be appreciated that, although link portions 201a and 201b of the illustrated embodiment of link 201 are shown as single lines, either or both of link portions 201a and 201b may comprise multiple information paths. For example, in an embodiment of system 200 adapted for use with CTTB signals, link portion 201a comprises 6 information paths (e.g., utilizes 6 pins of the integrated circuit packages of each of demodulators 213 and 223) and link portion 201b comprises 3 information paths (e.g., utilizes 3 pins of the integrated circuit packages of each of demodulators 213 and 223).

Demodulator 213 of the illustrated embodiment comprises ancillary information circuit 214 (comprising ancillary information estimator 214a, ancillary information reconstructor 214b and ancillary information compressor 214c (optional)), symbol information processor 215, and combiner and post-combining processor 216. Demodulator 223 of the illustrated embodiment comprises ancillary information circuit 224 (comprising ancillary information estimator 224a, ancillary information reconstructor 224b (optional), and ancillary information compressor 224c) symbol information processor 225, and combiner and post-combining processor 226 (optional). As will be discussed in detail below, demodulators 213 and 223 are configured to operate in a master/slave mode, wherein demodulator 223 operates as a slave to provide information to demodulator 213 operating as a master to implement symbol information combining. The combining may take as input the ancillary information, obtained from ancillary information estimator 214a, symbol information obtained from symbol information processor 215, ancillary information obtained from ancillary information reconstructor 214b, and symbol information obtained from symbol information processor 225. Although configured to operate in different modes (master/slave) in the illustrated embodiment, demodulator 223 of embodiments is constructed the same as demodulator 213 (e.g., comprising combiner and post-combining processor 226) to simplify manufacturing, to facilitate reversal of modes (as described in further detail below), to facilitate a cascaded multiple input configuration (as described in further detail below), etc. In various other embodiments (not illustrated) the demodulators may be constructed differently, such as wherein one is constructed to always operate as a slave and the other constructed to always operate as a master.

In operation according to embodiments of the invention, separate received signal inputs (e.g., provided by spatially separate antennas, or separate wires in a wired communication system) are provided to demodulators 213 and 223. Symbol information processor 215 of demodulator 213 may process the received signal to obtain symbol information. In one embodiment, for example, symbol information comprises received symbols after FEQ (frequency domain equalizer) in an OFDM communication system. In another embodiment, symbol information comprises unweighted LLRs (log likelihood ratios) obtained from soft slicer operating on received symbols after FEQ. Correspondingly, symbol information processor 225 of demodulator 223 may process a received signal to extract symbols therefrom. Although demodulators 213 and 223 may comprise separate integrated circuits providing parallel, or partially parallel, signal processing paths, demodulators 213 and 223 of embodiments are configured in a master/slave relationship in order to cooperate to provide received information combining (e.g., diversity combining) for improved information communication. Accordingly, demodulator 223 of the illustrated embodiment operates to transfer the symbol information obtained thereby to demodulator 213 via link portion 201a of link 201 for the aforementioned combining or other processing. It should be appreciated that this received information so transferred may comprise payload data, control channel data, overhead data, and/or other information being communicated or obtained from information being communicated to system 200 via the communication channel (e.g., wireless communication channel).

Demodulator 213 of the illustrated embodiment comprises combiner and post-combining processor 216 operable to provide combining and processing with respect to symbol information obtained from the received signals provided to demodulators 213 and 223. For example, system 200 may comprise a diversity receiver in which the symbols are combined by combiner and post-combining processor 216 using techniques such as maximal ratio combining (MRC), and the combined results are further processed to obtain the transmitted bit stream. Such combining techniques, however, often utilize information ancillary to the received signals, such as CSI. Accordingly, ancillary information, such as the aforementioned CSI, associated with the transferred symbols is also transferred between demodulators 213 and 223 for facilitating the combining of the symbol information. In the illustrated embodiment ancillary information is transferred via link portion 201b of link 201.

CSI captures the effect of the communication channel (e.g., wireless communication channel), such as due to the effects of noise and interference, and thus provides information regarding the reliability of the symbol information obtained from the signal received through the communication channel. Such ancillary information is useful in combining the symbol information obtained by the different symbol information processors since the symbol information obtained by each such symbol information processor may be associated with a communication channel having different attributes.

However, the intra communication system transfer of such ancillary information (in addition to the aforementioned received information) may utilize appreciable resources, whether bandwidth, signal paths, power, etc. Accordingly, embodiments of system 200 operate to provide intra communication system transfer of a compressed representation of ancillary information. The data throughput requirements for link 201 between demodulators 213 and 223 is reduced according to embodiments through application of compression techniques with respect to the transferred ancillary information.

Figure 3:
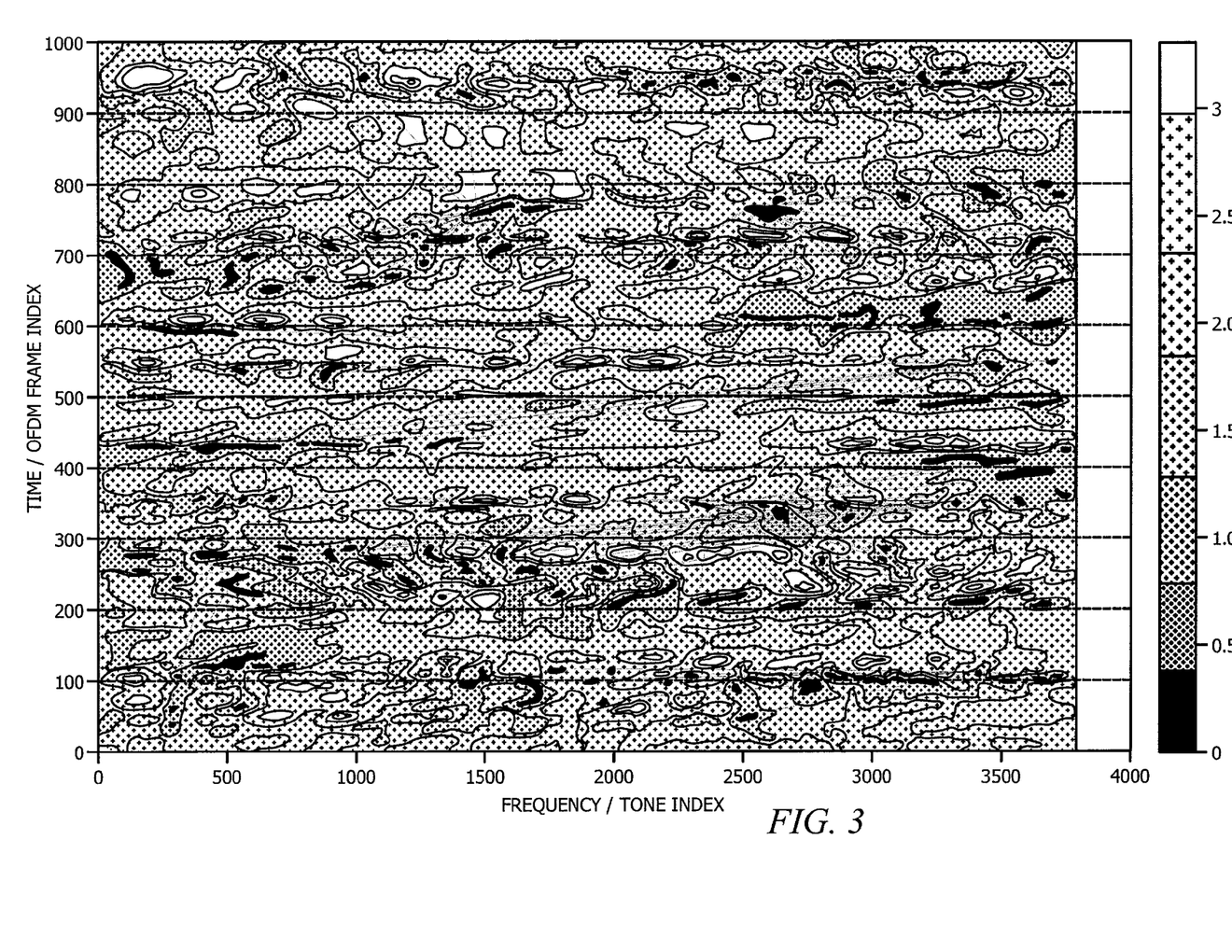
FIG. 3 shows a time frequency coherence graph of channel conditions as may be experienced by the system of FIG. 2.

It has been observed that, for many conditions, the time frequency coherence of the communication channel is several times larger than that of the actual transmitted/received information. This time frequency coherence can be observed in the graph of FIG. 3, which shows the channel gain (one type of CSI) for OFDM subcarriers obtained from the signal received at one received signal input of a CTTB receiver located in a vehicle driving at 90 kmph, the carrier frequency being 602 MHz wherein the X axis shows the subcarrier index and the OFDM symbol or frame index is shown along the Y axis. The darker the shading, the lower is the channel gain. Areas (i.e. set of sub-carrier and OFDM symbol indices) of the same or similar shading represent similar channel gains. The symbols transmitted in the same area are typically well uncorrelated and hence have more information content. Channel gain has much less but nevertheless important information content. Consistent with this, the channel gain can be represented by a reduced set representative of this smaller information content. For example, by selecting appropriately sized areas of time and frequency the channel gain across time and frequency can be represented by fewer values with negligible or no effect on the combining of received information. If a small enough area (referred to herein as a tile) within the graph of FIG. 3 is selected, the channel gain values do not vary significantly. Hence all values of the channel gain within an appropriately sized tile can be represented by a single value.

Embodiments of the invention implement a tile scheme to compress or otherwise reduce ancillary information for which intra communication system information transfer is provided. For example, time frequency tiles may be selected to be of a particular size or sizes corresponding to an area within which the time frequency coherence of a communication channel results in ancillary information, such as CSI, being substantially the same. Such tile sizes may be selected based upon expected channel conditions, measurements of actual channel conditions, etc. For example, a receiver may operate to analyze communication channel conditions to determine how fast the conditions vary across time and/or frequency. This information may then be utilized to select a tile size appropriate to the channel conditions experienced. Such analysis may be performed upon initialization, periodically, throughout operation of the system, etc.

Figure 4:
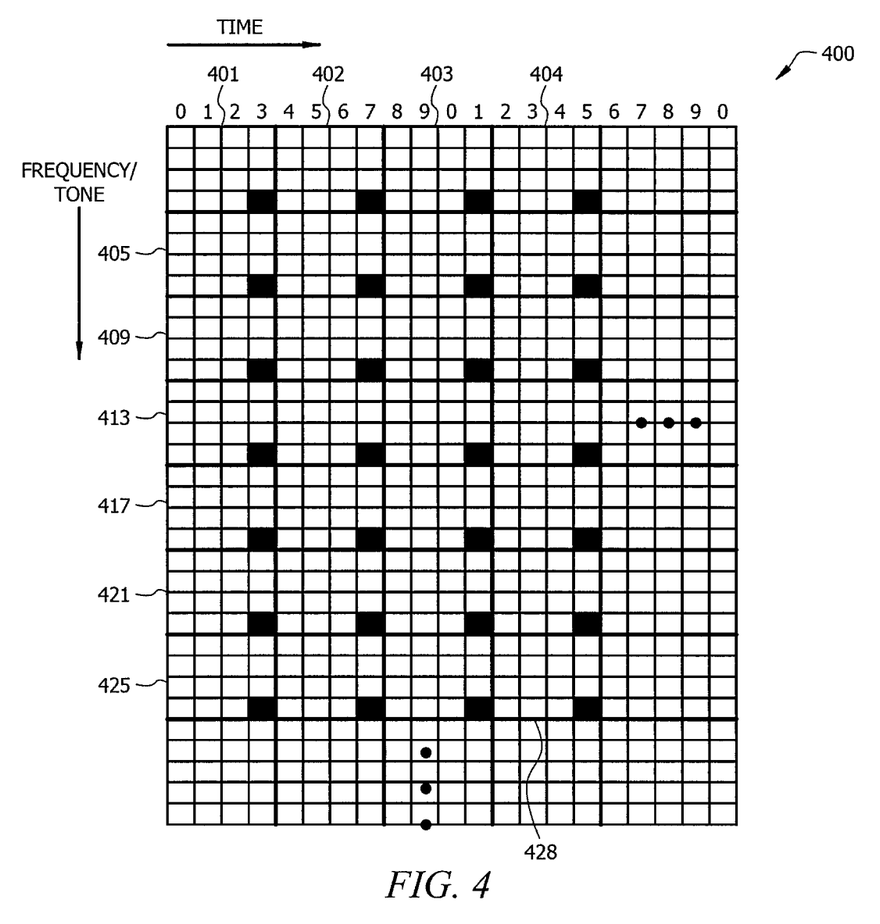
FIG. 4 shows a mosaic of tiles for compressing ancillary information for intra communication system information transfer according to embodiments of the invention.

An exemplary tile scheme as may be implemented for ancillary information compression according to embodiments of the invention is shown in FIG. 4. Mosaic 400 comprises a plurality of tiles (shown as tiles 401-428). Each tile of this representative embodiment includes 16 blocks that correspond to a subset of sub-carriers across 4 OFDM frames. The plurality of tiles is selected such that the ancillary information across the time and frequency dimensions of each tile can be represented by fewer values (e.g., represent 16 values using a single value, such as an average of the 16 values) with negligible or no effect on the combining of received information. Specifically, tiles 401-428 of mosaic 400 comprise an area of 4 time units by 4 frequency units, wherein the ancillary information for the represented time and frequency range is to be represented by reduced representative information. For example, a time unit may be an OFDM frame duration of 625 microseconds, and a frequency unit may be an OFDM sub-carrier spacing of 2 KHz.

It should be appreciated that the foregoing tile sizes are merely exemplary and that embodiments of the invention may utilize any tile size determined to be appropriate to a communication channel. In particular, it should be realized that the tiles need not comprise a same number of units in each axis (e.g., tiles may comprise a different number of time units and frequency units). Moreover, the tiles comprising a mosaic for a particular communication channel may not all be of a same size, such as where the coherence of the communication channel varies significantly along one or more axis.

The tile sizes utilized according to embodiments may vary with time, such as in response to changes in communication channel conditions. Accordingly, intra communication system information transfer may be utilized to communicate tile selection information (e.g., selected tile size(s) or an index of selected tile size(s)). For example, demodulator 223 may analyze communication channel conditions, select an appropriate tile size, and notify demodulator 213 of the selected tile size to facilitate reconstruction of transferred compressed ancillary information. Alternatively, demodulator 213 may analyze communication channel conditions to determine time coherence and frequency coherence values, (e.g., analyze the communication channel of a wireless link of the signal path of demodulator 213 and extrapolate the communication channel conditions of a wireless link of the signal path of demodulator 223), select an appropriate tile size based on these values, and notify demodulator 223 of the selected tile size to facilitate compression of the transferred ancillary information. For example, demodulator 213 may utilize spatial coherence to estimate channel conditions experienced by demodulator 223 from channel conditions experienced by demodulator 213 and select the tile size accordingly.

The ancillary information corresponding to the various subcarriers across the OFDM symbols of a tile may be represented by reduced representative information (compressed) using a number of techniques. Ancillary information may be compressed according to embodiments of the invention using time and/or frequency averaging, sampling in 1 dimension (1D) in time and/or frequency, sampling in 2 dimensions (2D) (e.g., repetitions of diagonal sampling), non-uniform sampling (e.g., in 1D or 2D), and/or the like. For example, ancillary information compressor 224a may operate to average the CSI values of the tile to provide a compressed (e.g., single) CSI value representative of all blocks of the tile.

The foregoing compressed representation of CSI has been found to provide improved results with respect to combining of symbol information, due to mitigation of errors in estimation associated with the CSI of the individual blocks. Estimation errors can typically be modeled as random processes, and as such the magnitude of the errors may be reduced due to the averaging operation performed during the compression of the CSI. Embodiments of the invention may operate to select tile size at least in part based upon metrics in addition to or in the alternative to communication channel coherence, such as to mitigate error associated with the ancillary information by way of averaging.

The ancillary information (e.g., CSI) transferred according to embodiments of the invention may be transferred in a form different than that which is ultimately utilized to facilitate symbol information combining or other processing according to embodiments of the invention. For example, raw pilot information (as opposed to CSI obtained from the raw pilot information) may be transferred using compression techniques such as the aforementioned averaging, sampling, etc. Accordingly, rather than performing explicit channel and CSI estimation, ancillary information estimator 224 of embodiments may operate to collect raw pilot information, (and optionally compress it based on the estimate time and frequency coherence values) for intra communication system information transfer.

In operation according to embodiments, the compressed or otherwise reduced ancillary information is transferred from demodulator 223 to demodulator 213 for use in combining the symbol information obtained by each such demodulator. That is, combiner and post-combining processor 216 of demodulator 213 operates to combine the symbol information extracted by symbol information processor 215 and symbol information processor 225 using ancillary information (e.g., CSI) associated with symbol information from each such symbol information processor in order to provide resulting high quality symbol information (e.g., using MRC techniques).

According to embodiments, ancillary information estimator 214a of demodulator 213 operates to estimate the CSI associated with the symbol information stream provided by symbol information processor 215. Correspondingly, ancillary information estimator 224a of demodulator 223 operates to provide CSI estimates associated with the symbol information stream provided by information symbol processor 225 (as transferred via link 201 to symbol information processor 215). However, the ancillary information provided to demodulator 213 by demodulator 223 is compressed according to embodiments of the invention. Accordingly, ancillary information reconstructor 214b of embodiments operates to reconstruct the ancillary information or otherwise processes the ancillary information for facilitating combining of received information. For example, where averaging techniques have been used to compress the ancillary information, the averaged value for the ancillary information as transferred to demodulator 213 may be replicated for each block of a tile to use with symbol information corresponding thereto. Alternatively, wherein sampling techniques have been used to compress the ancillary information, interpolation and/or extrapolation may be utilized (e.g., linear interpolation/extrapolation) to assign ancillary information values between sampled values transferred to demodulator 213.

Where the ancillary information is transferred in a form different than that which is ultimately utilized to facilitate information combining or other processing according to embodiments of the invention, demodulator 213 may not only operate to reconstruct the transferred ancillary information but may also process the ancillary information for use in combining symbol information. For example, raw received pilot symbols that comprise ancillary information which may be compressed and transferred to 213 may then be processed to provide CSI by ancillary information reconstructor 214b. In such embodiments 214b may in addition to any reconstruction, also provide channel estimation processing and/or CSI estimates corresponding to the symbol information stream transferred via 201a, to combiner and post-combining processor 216.

Some level of delay may result from implementing compression and/or reduction techniques according to embodiments of the invention. For example, where averaging within a tile is utilized as a compression technique, the average CSI value for a tile is unavailable until the last block of the tile has been processed (this is represented in mosaic 400 as the shaded block of each of tiles 401-428). Thus, transfer of the ancillary information and combining of symbols may be delayed in correspondence to the tile size selected. Accordingly, embodiments of demodulator 213 implement a buffer sufficient to accommodate ancillary information compression delay. Moreover, embodiments of the invention may operate to select tile size at least in part based upon metrics in addition to or in the alternative to communication channel time and/or frequency coherence interval, such as to result in an acceptable amount of delay, to accommodate a particular size of buffer, etc.

Figure 5:
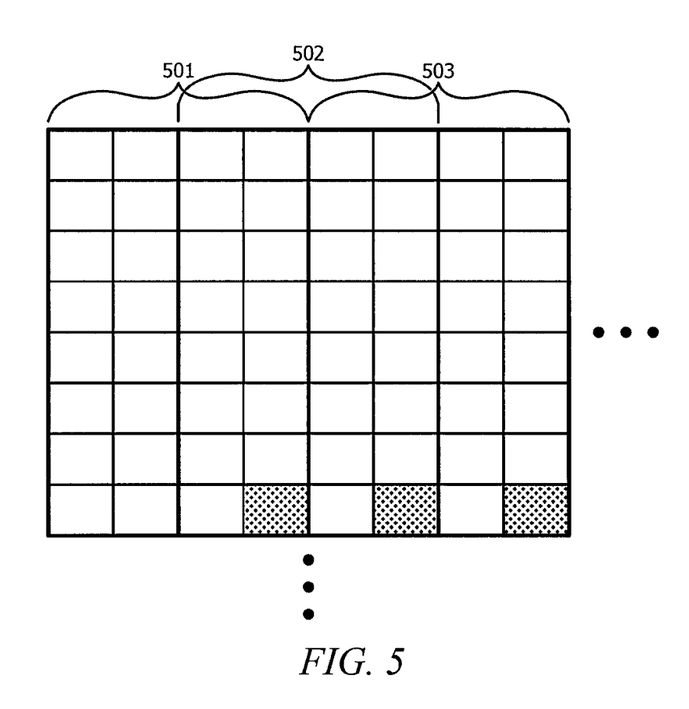
FIG. 5 shows another mosaic of tiles for compressing ancillary information for intra communication system information transfer according to embodiments of the invention.

Embodiments of the invention implement various techniques to reduce or mitigate delay associated with the compression of ancillary information. For example, an embodiment of the invention may implement a rolling tile configuration whereby, although a tile is selected to comprise a particular number of blocks, compressed ancillary information is provided on a rolling window basis having a period less than the number of blocks. Such a rolling tile configuration is illustrated in FIG. 5, wherein the tiles are selected to comprise 32 blocks. However, the period between rolling tiles 501 and 502 and between 502 and 503 is only 16 blocks. Such a configuration provides an embodiment wherein delay is lessened while the error mitigation of averaging remains that associated with a large tile size.

As another example of embodiments which reduce or mitigate delay associated with compression of ancillary information, the ancillary information average for one tile may be utilized with respect to symbol information associated with a subsequent tile. For example, an average CSI value determined from tile 401 of FIG. 4 may be utilized with respect to symbols associated with tile 402. Such an embodiment may be effective in eliminating compression delay where the communication channel varies slowly in one or more dimension, and the tile size is chosen in view of such processing.

Ancillary information compression and reconstruction implemented according to embodiments of the invention is operable to significantly reduced intra communication system information transfer without loss of any of the received information. In a CTTB application, for instance, where the total transfer rate may typically be approximately 156 Mbps (i.e., 72 Mbps (received information)+84 Mbps (ancillary information)=156 Mbps), operation according to embodiments of the invention reduces the total transfer rate to approximately 75 Mbps (i.e., 72 Mbps (received information)+3 Mbps (ancillary information)=75 Mbps) without any loss in performance. That is, the transfer rate for the ancillary information transferred is reduced to approximately 2 to 3 Mbps according to embodiments, without loss in performance for almost all types of channel conditions encountered. In many cases the performance was found to be improved as a result of the averaging process. Embodiments of the invention operate to reduce the ancillary data transferred even further than the foregoing example, depending on the channel conditions.

Embodiments of the invention provide a intra communication system link configuration adapted for communication of compressed information, and thus a number of signal paths of link 201 (e.g., signal paths of link portion 201b) may be fixed at time of manufacturing system 200 in accordance with the expected worst case compression rate (e.g., smallest tile size) for expected communication channels. Although the fixing of a number of signal paths available for intra communication system information transfer may suggest the use of a fixed ancillary information compression technique (e.g., fixed tile size), embodiments of the invention implement dynamic information compression techniques. For example, embodiments of the invention may analyze measured CSI to determine the actual time frequency coherence experienced in the communication channel and adjust the tile sizes of tiles 401-428 to provide a maximum amount of compression with respect to the ancillary information, such as to realize further power savings and/or benefits arising from averaging the CSI estimates.

In addition to or in the alternative to reducing intra communication system information transfer through compression of ancillary information, embodiments of the invention reduce intra communication system information transfer by reducing the symbol information transferred. For example, embodiments operate to reduce symbol information transferred between demodulators 213 and 223 by skipping (not transferring) symbol information corresponding to some sub-carriers and OFDM symbols. In operation according to an embodiment, demodulator 213 observes the quality of sub-carriers (frequencies or tones) across OFDM frames, as received by demodulator 213 to identify the "bad" sub-carriers (e.g., sub-carriers for which signal quality or SINR is below a predetermined threshold, or obtaining of reliable information from the corresponding symbols is unlikely. Thereafter, demodulator 213 may request that demodulator 223 provide its symbol information only for the sub-carriers identified as "bad" sub-carriers at demodulator 213. Alternatively, demodulator 223 may autonomously operate to identify the sub-carriers for which received information is to be provided to demodulator 213. For example, demodulator 223 may observe the quality of sub-carriers as received by demodulator 223 to identify the "good" sub-carriers (e.g., sub-carriers for which signal quality is above a predetermined threshold, or obtaining of information from the corresponding symbols is likely, and reliable). Thereafter, demodulator 223 may provide its received information only for the sub-carriers identified at "good" sub-carriers to demodulator 213.

Reduction in the transferred information is additionally or alternatively provided according to embodiments of the invention through reversing the roles of master and slave circuitry from time to time. For example, where the information received by demodulator 223 is received so as to require less manipulation through the aforementioned combining than the information received by demodulator 213, and thus a reduction in the transferred information could be realized (e.g., reduction in transfer of received information and/or ancillary information), the master and slave status of demodulators 213 and 223 may be reversed to minimize the information exchange.

Operating in a reversed master/slave configuration (i.e., demodulator 223 operating as master and demodulator 213 operating as slave), symbol information processors 215 and 225 preferably continue to process the respective received input signal to obtain symbol information therefrom. However, demodulator 213 operates to transfer the symbols (received information) extracted thereby to demodulator 223 via link portion 201a of link 201 for the aforementioned combining or other processing. Demodulator 223 of the illustrated embodiment comprises combiner and post-combining processor 226 operable to provide processing with respect to symbols extracted from the received input streams provided to demodulators 213 and 223. Ancillary information, such as the aforementioned CSI, associated with the transferred symbols is also transferred between demodulators 223 and 213 for facilitating the combining of the received information via link portion 201b of link 201. Accordingly, ancillary information estimator 214a may operate to estimate the CSI for each time frequency block of a tile and then ancillary information compressor 214c may average the CSI values of the tile to provide a CSI value representative of all blocks of the tile to ancillary information reconstructor 224c. Correspondingly, ancillary information estimator 224a of demodulator 223 operates to estimate the CSI associated with the symbol stream provided by symbol information processor 225. Ancillary information reconstructor 224b of demodulator 223 of embodiments operates to provide CSI estimates associated with the symbol stream provided by symbol processor 215 (as transferred via link 201 to symbol information processor 225). It should be appreciated that ancillary information reconstructor 224*b* of embodiments operates to reconstruct the ancillary information or otherwise processes the ancillary information for facilitating combining of received information.

It should be appreciated that the concepts of the present invention are not limited to application with respect to the two signal paths shown (e.g., two antenna systems). Intra communication system transfer of information according to the concepts of the present invention may be provided with respect to any number of signal paths. For example an embodiment wherein intra communication system transfer of information is provided with respect to 3, 4, or more signal paths may be provided according to the concepts of the present invention. In such configurations, one or more demodulators may be configured as slave demodulators, and thus may be adapted as demodulator 223 discussed above. Likewise, one or more demodulators may be configured as master demodulators, and thus may be adapted as demodulator 213 discussed above. It should be appreciated that demodulators of said configurations may be adapted to receive symbol information and/or ancillary information in cascade (e.g., symbol information and ancillary information received from one combiner and used for symbol information combining which is cascaded to another demodulator) or in parallel (e.g., symbol information and ancillary information from a plurality of demodulators, provided to a same demodulator for symbol information combining). The transfer of symbol information and/or ancillary information between such demodulators preferably implements compression and/or symbol skipping as described in detail above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    receiving a signal;
    deriving ancillary information and symbol information from the received signal;
    determining reduced intra communication system information for transfer based at least in Dart on the ancillary information, wherein the reduced intra communication system information comprises information derived from the ancillary information; and
    selecting a tile size for use in providing the reduced intra communication system information for transfer, wherein the selecting the tile size comprises:
    analyzing coherence associated with the ancillary information.

2. The method of claim 1, wherein the received signal comprises information received at one input of a multiple input receiver, and wherein the ancillary information comprises channel state information for a channel through which the received information was received by the multiple input receiver.

3. The method of claim 1, wherein the determining the reduced intra communication system information comprises:
    determining a reduced representation of the ancillary information for transferring.

4. The method of claim 3, wherein the determining the reduced representation of the ancillary information comprises:
    averaging a plurality of ancillary information values of the ancillary information.

5. The method of claim 3, wherein the determining the reduced representation of the ancillary information comprises:
    sampling a subset of data points of the ancillary information.

6. The method of claim 1, wherein the determining the reduced intra communication system information comprises:
    determining a portion of received signal not to be transferred.

7. The method of claim 6, wherein the determining the portion of the received signal comprises:
    analyzing the ancillary information to determine the portion of the received signal not to be transferred.

8. The method of claim 1 wherein the selecting the tile size comprises:
    determining an acceptable delay associated with processing received signal.

9. The method of claim 1, wherein the selecting the tile size comprises:
    determining an acceptable received signal buffering amount.

10. A method for information transfer between a plurality of information processing circuits of a communication system, the method comprising:
    receiving first information by a first information processing circuit of the communication system;
    transferring the received first information to a second information processing circuit of the communication system;
    collecting ancillary information associated with the received first information;
    reducing the ancillary information for transfer to the second information processing circuit; and
    transferring the reduced ancillary information to the second information processing circuit,
    wherein the reducing the ancillary information comprises:
    determining a coherence of the ancillary information;
    exploiting the coherence to provide a reduced representation of the ancillary information.

11. The method of claim 10, wherein the exploiting the coherence comprises:
    averaging a plurality of ancillary information values of the ancillary information, wherein the plurality of ancillary information values are selected from within an identified coherence area.

12. The method of claim 10, wherein the exploiting the coherence comprises:
    sampling a subset of data points of the ancillary information from within an identified coherence area.

13. The method of claim 10, wherein the determining a coherence of the ancillary information comprises:

selecting a coherence tile size for use in the exploiting the coherence to provide the reduced representation of the ancillary information.

14. The method of claim 13, wherein the selecting the coherence tile size further comprises:
determining an acceptable delay associated with processing the received first information.

15. The method of claim 13, wherein the selecting the coherence tile size further comprises:
determining an acceptable received first information buffering amount.

16. A method for information transfer between a plurality of information processing circuits of a communication system, the method comprising:
receiving first information by a first information processing circuit of the communication system;
transferring the received first information to a second information processing circuit of the communication system;
collecting ancillary information associated with the received first information;
reducing the ancillary information for transfer to the second information processing circuit:
transferring the reduced ancillary information to the second information processing circuit;
determining a portion of the received first information not to be transferred, wherein the transferred received first information does not include the received first information not to be transferred; and
selecting a tile size for use in providing a reduced intra communication system information for transfer, wherein the selecting the tile size comprises:
analyzing coherence associated with the ancillary information.

17. The method of claim 16 further comprising:
receiving the transferred reduced ancillary information by the second information processing circuit; and
processing the transferred reduced ancillary information for use with the transferred received first information.

18. The method of claim 17, wherein the processing the transferred reduced ancillary information comprises:
reconstructing a representation of the ancillary information from the transferred reduced ancillary information.

19. The method of claim 17, further comprising:
receiving second information by the second information processing circuit;
receiving the transferred first information by the second information processing circuit;
combining the received second information and the received transferred first information using the received transferred reduced ancillary information.

20. A method for information transfer between a plurality of information processing circuits of a communication system, the method comprising:
receiving first information by a first information processing circuit of the communication system:
transferring the received first information to a second information processing circuit of the communication system:
collecting ancillary information associated with the received first information;
reducing the ancillary information for transfer to the second information processing circuit;
transferring the reduced ancillary information to the second information processing circuit,
wherein the received first information comprises information received at one input of a multiple input receiver, and wherein the ancillary information comprises channel state information for a channel through which the received information was received by the multiple input receiver,
wherein the first information processing circuit comprises a first integrated circuit of the multiple input receiver operating in a slave mode, wherein the second information processing circuit comprises a second integrated circuit of the multiple input receiver operating in a master mode,
the method further comprising:
reversing the slave and master modes of the first and second integrated circuits to facilitate reducing information transfer therebetween.

21. A system comprising:
an intra communication system link coupling a first information processing circuit and a second information processing circuit;
the first information processing circuit coupled to a first signal input and configured to receive first information from the first signal input and transfer the first information to a second information processing circuit, the first information processing circuit further being configured to gather information ancillary to the first information, to reduce the ancillary information, and to transfer the ancillary information to the second information processing circuit via the intra communication system link; and
the second information processing circuit coupled to a second signal input and configured to receive second information from the second signal input, to receive the transferred first information via the intra communication system link, and to receive the transferred ancillary information via the intra communication system link, the second information processing circuit further being configured to combine the transferred first information and the received second information using the transferred ancillary information,
wherein the first information processing circuit is operable in a slave mode and the second information processing circuit is operable in a master mode, and
wherein the first information processing circuit and the second information processing circuit are configured for reversal of the slave and master modes to facilitate reduction in information communicated via the intra communication system link.

22. The system of claim 21, wherein the first information processing circuit comprises a first integrated circuit of a multiple input communication system, and wherein the second information processing circuit comprises a second integrated circuit of the multiple input communication system.

23. The system of claim 21, wherein the first information processing circuit comprises a channel estimator to monitor a communication channel associated with the first signal input and to provide the ancillary information, and wherein the second information processing circuit comprises a combining processor to combine the transferred first information and the received second information using the transferred ancillary information.

24. The system of claim 21, wherein the combining the transferred first information and the received second information using the transferred ancillary information includes reconstructing a representation of the ancillary information from the reduced ancillary information provided to the second information processing circuit as the transferred ancillary information.

25. The system of claim 23, wherein the first information processor circuit comprises a symbol processor to extract symbols from a received signal to extract the first information, and wherein the second information processor circuit comprises a symbol processor to extract symbols from a received signal to extract the second information.

* * * * *

UNITED STATES PATENT AND TRADEMARK OFFICE
CERTIFICATE OF CORRECTION

PATENT NO. : 8,675,748 B2  
APPLICATION NO. : 12/787147  
DATED : March 18, 2014  
INVENTOR(S) : Sriram Mudulodu et al.

Page 1 of 1

It is certified that error appears in the above-identified patent and that said Letters Patent is hereby corrected as shown below:

In the Claims:

At column 13, claim number 1, line number 59, delete "Dart" and replace with --part--.
At column 15, claim number 20, line number 56, delete "system:" and replace with --system;--.
At column 15, claim number 20, line number 58, delete "system:" and replace with --system;--.

Signed and Sealed this
Seventeenth Day of June, 2014

Michelle K. Lee
*Deputy Director of the United States Patent and Trademark Office*